US012670086B2

(12) United States Patent
Elsen et al.

(10) Patent No.: US 12,670,086 B2
(45) Date of Patent: Jun. 30, 2026

(54) **DISTRIBUTED TOP *K* COMPUTATION**

(71) Applicant: GDM Holding LLC, Mountain View, CA (US)

(72) Inventors: Erich Konrad Elsen, Naperville, IL (US); Stuart Christopher Benedict Abercrombie, Huntingdon (GB)

(73) Assignee: GDM Holding LLC, Mountain View, CA (US)

( * ) Notice: Subject to any disclaimer, the term of this patent is extended or adjusted under 35 U.S.C. 154(b) by 523 days.

(21) Appl. No.: 17/990,578

(22) Filed: Nov. 18, 2022

(65) Prior Publication Data

US 2023/0153232 A1     May 18, 2023

Related U.S. Application Data

(60) Provisional application No. 63/280,738, filed on Nov. 18, 2021.

(51) Int. Cl.
*G06F 11/3668*     (2025.01)
*G06F 9/50*     (2006.01)

(52) U.S. Cl.
CPC ........ *G06F 11/3684* (2013.01); *G06F 9/5027* (2013.01); *G06F 11/368* (2013.01)

(58) Field of Classification Search
CPC ... G06F 11/3684; G06F 9/5027; G06F 11/368
USPC ....................................................... 718/102
See application file for complete search history.

(56) References Cited

U.S. PATENT DOCUMENTS

| | | | | |
|---|---|---|---|---|
| 10,592,555 B1 * | 3/2020 | Zhang | ..................... | G06F 40/30 |
| 11,188,302 B1 * | 11/2021 | Diamant | ................... | G06F 7/24 |
| 11,601,509 B1 * | 3/2023 | Lofgren | ................ | G06Q 50/01 |
| 11,704,318 B1 * | 7/2023 | Keivanloo | ............ | G06F 16/248 |
| | | | | 707/769 |
| 2002/0122587 A1 * | 9/2002 | Lim | .................... | G06F 16/5838 |
| | | | | 707/E17.025 |

(Continued)

FOREIGN PATENT DOCUMENTS

WO     WO 2021/071930     4/2021

OTHER PUBLICATIONS

International Preliminary Report on Patentability in International Appln. No. PCT/EP2022/082276, dated May 30, 2024, 9 pages.

(Continued)

*Primary Examiner* — Adam Lee
(74) *Attorney, Agent, or Firm* — Fish & Richardson P.C.

(57)     ABSTRACT

Methods, systems, and apparatus, including computer programs encoded on computer storage media, for distributing a top k computation across multiple computing units of an integrated circuit One of the methods includes computing, by each of the plurality of computing units and for each candidate vector in a respective subset of the candidate vectors assigned to the computing unit, a respective distance between the query vector and the candidate vector; initializing, by the integrated circuit, a cut-off distance value; determining, by the integrated circuit, a final cut-off distance value; and providing, by the integrated circuit and as an output of a top k computation for the query vector and the set of candidate vectors, the candidate vectors that have respective distances that satisfy the final cut-off distance value.

20 Claims, 4 Drawing Sheets

(56) References Cited

U.S. PATENT DOCUMENTS

| | | | | |
|---|---|---|---|---|
| 2008/0033937 | A1* | 2/2008 | Cha | G06F 16/90335 |
| | | | | 707/999.005 |
| 2011/0078133 | A1* | 3/2011 | Bordawekar | G06F 16/90335 |
| | | | | 707/E17.014 |
| 2013/0268261 | A1* | 10/2013 | Kim | G06F 16/367 |
| | | | | 704/9 |
| 2013/0279806 | A1* | 10/2013 | Tonisson | G06F 16/56 |
| | | | | 382/173 |
| 2015/0161211 | A1* | 6/2015 | Patel | G06F 16/24539 |
| | | | | 707/721 |
| 2017/0093910 | A1* | 3/2017 | Gukal | H04L 63/1416 |
| 2017/0223046 | A1* | 8/2017 | Singh | H04L 63/1491 |
| 2017/0277668 | A1* | 9/2017 | Luo | G06F 16/345 |
| 2017/0329783 | A1* | 11/2017 | Singh | H04L 63/1441 |
| 2018/0052876 | A1* | 2/2018 | Liu | G06F 16/3347 |
| 2018/0137137 | A1* | 5/2018 | Jin | G06F 16/90324 |
| 2018/0232443 | A1* | 8/2018 | Delgo | G06F 16/367 |
| 2018/0329990 | A1* | 11/2018 | Severn | G06F 16/335 |
| 2019/0114348 | A1* | 4/2019 | Gao | G06N 3/0442 |
| 2019/0147334 | A1* | 5/2019 | Lisowska | G06N 3/047 |
| | | | | 706/25 |
| 2019/0251184 | A1* | 8/2019 | Shan | G06F 16/9532 |
| 2019/0278850 | A1* | 9/2019 | Atasu | G06F 16/3347 |
| 2019/0392082 | A1* | 12/2019 | Bell | G06N 3/09 |
| 2020/0226137 | A1* | 7/2020 | Zhao | G06F 16/24553 |
| 2020/0311077 | A1* | 10/2020 | Zhang | G06F 3/068 |
| 2021/0073270 | A1* | 3/2021 | Motiian | G06V 10/758 |
| 2021/0149963 | A1* | 5/2021 | Agarwal | G06F 16/90332 |
| 2021/0201863 | A1* | 7/2021 | Bosch Vicente | G10H 1/0008 |
| 2021/0294780 | A1* | 9/2021 | Lifsches | G06F 16/2468 |
| 2021/0319022 | A1* | 10/2021 | Makkadayil | G06F 16/24542 |
| 2021/0334582 | A1* | 10/2021 | Erez | G06T 7/11 |
| 2022/0067533 | A1* | 3/2022 | Jiao | G06N 3/045 |
| 2022/0164380 | A1* | 5/2022 | Lin | G06F 16/532 |
| 2023/0031152 | A1* | 2/2023 | Bhaskaran | G06F 16/24578 |
| 2023/0111978 | A1* | 4/2023 | Veit | G06F 16/90335 |
| | | | | 706/25 |
| 2023/0170040 | A1* | 6/2023 | Hauck | G16B 5/20 |
| | | | | 703/11 |

OTHER PUBLICATIONS

International Search Report and Written Opinion in International Appln. No. PCT/EP2022/082276, dated Jan. 30, 2023, 15 pages.

Michel, "Top-K Aggregation Queries in Large-Scale Distributed Systems," PHD Thesis, Universitat des Saarlandes, Saarbrucken, Germany, 2007, 10 pages.

Pritzel et al., "Neural Episodic Control," CoRR, Mar. 6, 2017, arxiv.org/abs/1703.01988, 12 pages.

Shanbhag et al., "Efficient Top-K Query Processing on Massively Parrallel Hardware," SIGMOD'18, Jun. 10-15, 2018, pp. 1557-1570.

Sprechmann et al., "Memory-based Parameter Adaptation," CoRR, Feb. 28, 2018, arxiv.org/abs/1802.10542, 16 pages.

Wayne et al., "Unsupervised Predictive Memory in a Goal-Directed Agent," CoRR, Mar. 28, 2018, arxiv.org/abs/1803.10760, 57 pages.

Wikipedia.org [online], "k-nearest neighbors algorithm," last edited May 8, 2023, retrieved on May 22, 2023, retrieved from URL<https://en.wikipedia.org/wiki/K-nearest_neighbors_algorithm/>, 11 pages.

Wikipedia.org [online], "Selection algorithm," last edited May 10, 2023, retrieved on May 22, 2023, retrieved from URL<https://en.wikipedia.org/wiki/Selection_algorithm/>, 11 pages.

* cited by examiner

300

| Identify current cut-off distance value |
| 302 |

| Generate test cut-off distance value |
| 304 |

| Provide data identifying the test cut-off distance value |
| 306 |

| Obtain counts |
| 308 |

| Compute sum of counts |
| 310 |

| If sum of counts less than $k$, update current cut-off distance value to be equal to the test distance value |
| 312 |

400

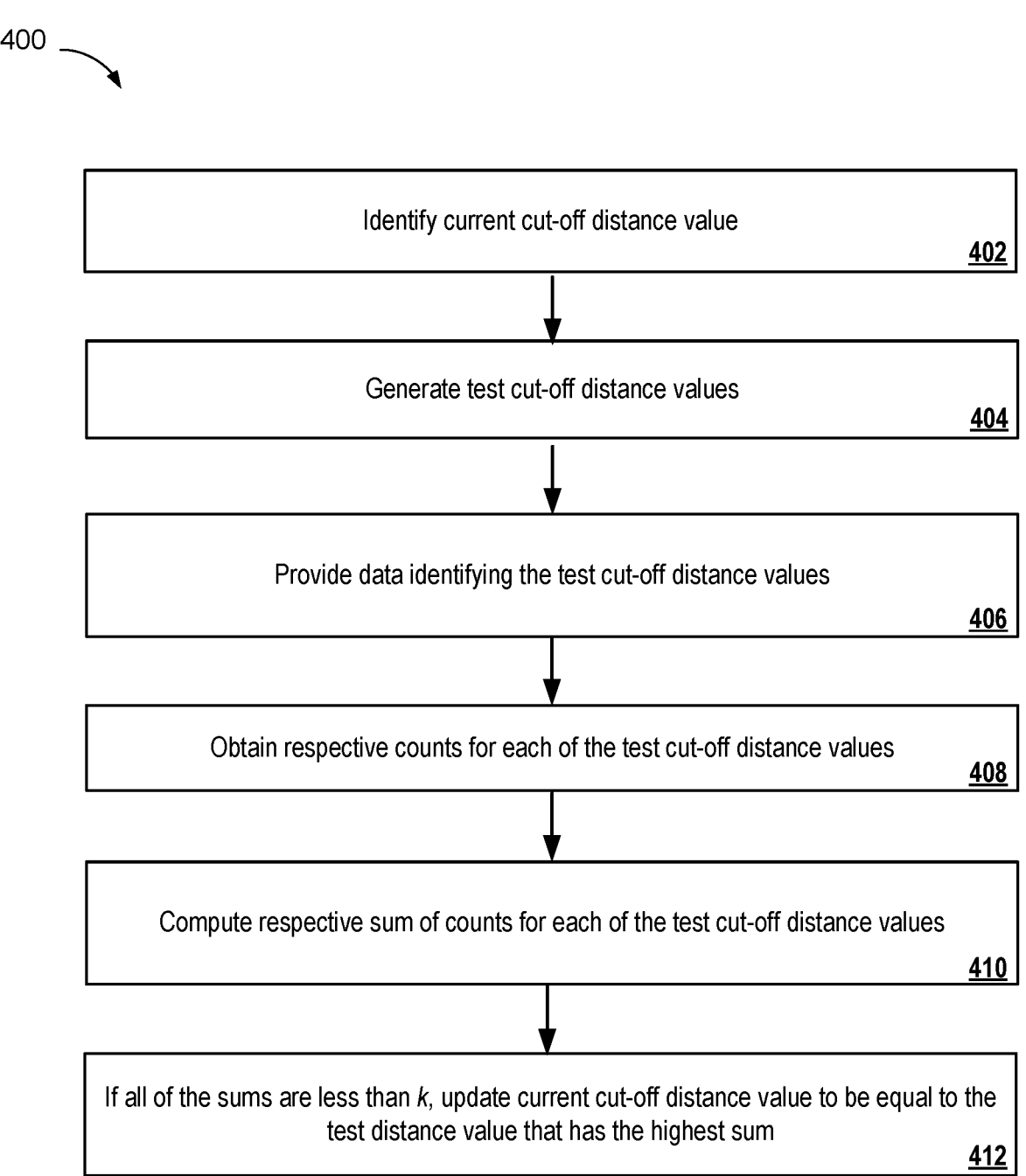

Identify current cut-off distance value

402

Generate test cut-off distance values

404

Provide data identifying the test cut-off distance values

406

Obtain respective counts for each of the test cut-off distance values

408

Compute respective sum of counts for each of the test cut-off distance values

410

If all of the sums are less than $k$, update current cut-off distance value to be equal to the test distance value that has the highest sum

DISTRIBUTED TOP K COMPUTATION

CROSS-REFERENCE TO RELATED APPLICATION

This application claims priority to U.S. Provisional Application No. 63/280,738, filed on Nov. 18, 2021. The disclosure of the prior application is considered part of and is incorporated by reference in the disclosure of this application.

BACKGROUND

This specification generally relates to performing a top k computation by distributing the computation across multiple hardware compute tiles.

A top k computation is a computation that receives a query vector and a set of candidate vectors and identifies the k candidate vectors that are closest to the query vector according to some distance measure.

SUMMARY

This specification generally describes techniques for distributing a top k computation across multiple hardware compute tiles, i.e., hardware computing units, within an integrated circuit. The output of the top k computation returns the k candidate vectors from a set of candidate vectors that are closest to a query vector according to a specified distance measure. The value of k is specified prior to the computation and is generally small relative to the total number of candidate vectors. For example, if there are a million candidate vectors, the value of k can be less than two thousand. Thus, the objective of the top k computation is to determine a small subset of a large set of candidate vectors that are the closest to the query vector according to the distance measure.

In particular, each compute tile computes, e.g., using special-purpose hardware of the compute tile, a respective distance between the query vector and each candidate vector in a respective subset of the set of candidate vectors. The integrated circuit then uses the respective distances to iteratively update a cut-off distance value and, after the iterative updating, selects the candidate vectors that have distances that are closer than the final cut-off distance value as the k candidate vectors for the top k computation.

The subject matter described in this specification can be implemented in particular embodiments so as to realize one or more of the following advantages.

Some application-specific integrated circuits (ASICs) include multiple compute tiles that can compute distances between vectors very quickly in hardware. That is, each compute tile is a specialized hardware accelerator that includes hardware that can be used to compute the distances. For example, some neural network accelerators include multiple compute tiles that each include a set of multiply accumulate units (MACs) that can be used to perform multiple distance computations in parallel or, more generally, with minimal latency. However, these compute tiles have limited dedicated memory and, due to their specialized nature, are unable to perform many other types of computations.

Additionally, large scale top k computations, i.e., computations that require identifying a relatively small number k of candidate vectors from a large set of candidate vectors, are an essential component of many industrial applications, e.g., machine learning, information retrieval, document ranking, Internet search serving, and so on.

However, these compute tiles cannot efficiently perform a large scale top k computation. In particular, the limited dedicated memory of any single given compute tile is insufficient to store a large set of candidate vectors from which the k nearest vectors must be found. Moreover, while the compute tiles can perform distance computations in hardware, the compute tiles are not able to perform other operations that are required to perform a top k computation in hardware, e.g., comparing a large number of distances against one another. More specifically, because all of the candidate vectors cannot fit in the memory of any single compute tile, in order to perform a top k computation, a given compute tile would need to be able to compare distances for candidate vectors in the current subset that is stored in memory against distances that were previously computed for candidate vectors that were previously stored in memory. However, the hardware of these compute tiles is not able to perform these comparisons, e.g., because they are not able to be represented as operations that can be carried out by the MACs of the compute tile.

The techniques described in this specification leverage the ability of the compute tiles to compute distances in hardware and divide the work between the compute tiles and a processing core of the integrated circuit in order to allow the top k computation to be performed efficiently. In particular, by only requiring the compute tiles to compute distances and compare the computed distances against a threshold, the described techniques leverage the ability of the hardware tiles for efficient distance computation without requiring any single tile to store more than the small subset of the large set of candidate vectors that will fit in designated memory of the tile. Moreover, by performing the described techniques, the processing core is only required to update a "cut-off value" using counts that are computed in parallel on each of the compute tiles, resulting in a low latency computation that leverages the distributed nature of the integrated circuit and is motivated by the hardware configuration of the integrated circuit.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates another example process for performing an iteration of updating the cut-off distance value.

DETAILED DESCRIPTION

This specification describes techniques for distributing a top k computation across multiple compute tiles and a processing core of an integrated circuit.

Figure 1:
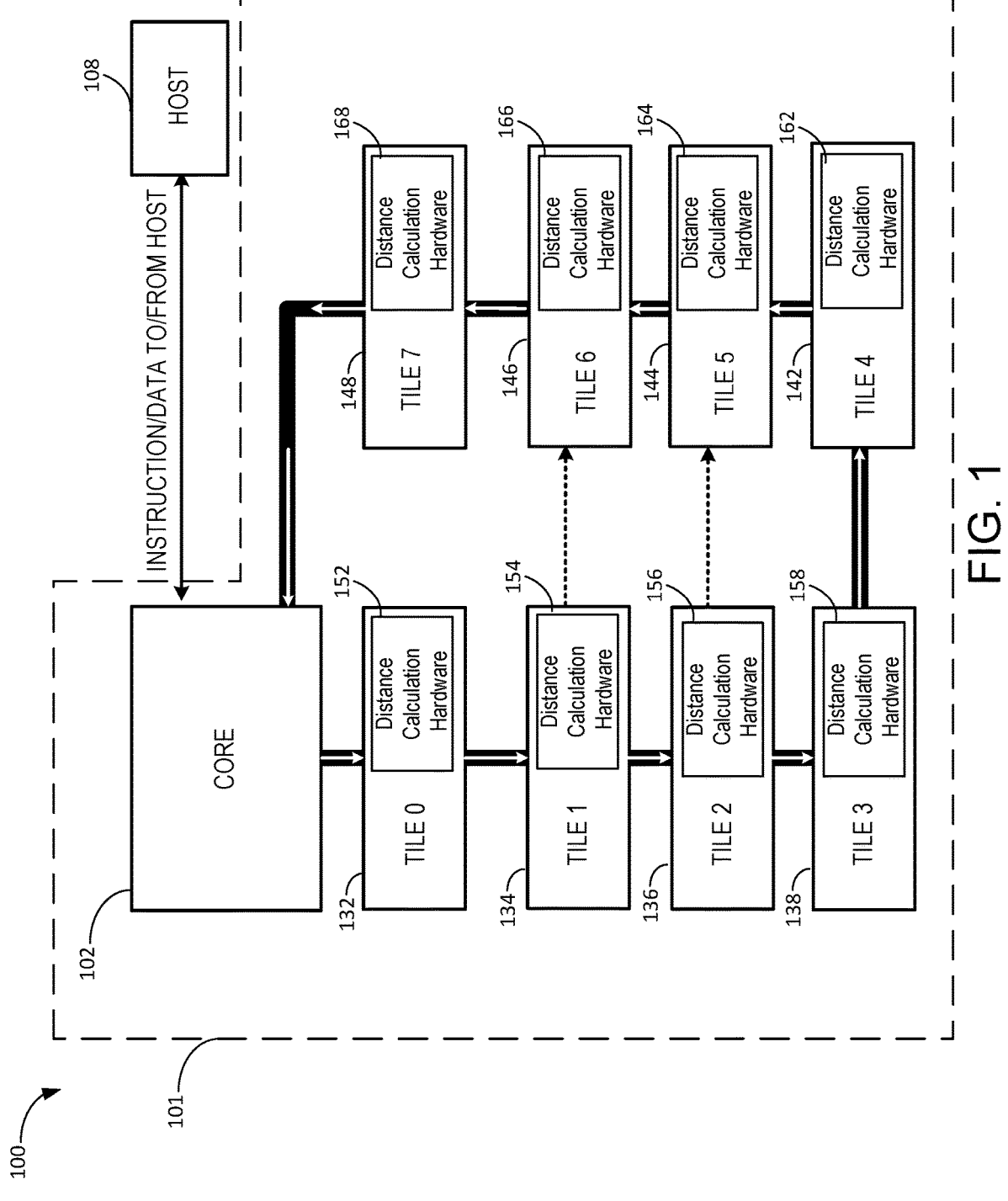
FIG. 1 shows an example hardware computing system for performing a top k computation.

FIG. 1 shows an example hardware computing system 100 for performing a top k computation.

The system 100 includes an integrated circuit 101 and a host 108 that is located off-chip and is configured to communicate with the integrated circuit 101 over a wired or wireless connection.

The host 108 can be implemented as one or more computer programs on one or more hardware devices that are located off-chip, i.e., that are not part of the integrated circuit 101, and controls the operation of the integrated circuit 101, i.e., by providing instructions, input data, or both to the integrated circuit 101 to cause the integrated circuit 101 to perform operations.

As shown in FIG. 1, the integrated circuit 101 includes a processing core 102 and a plurality of tiles 132-148. As some examples, the integrated circuit 101 may be a general purpose or specific purpose processor including hardware configured as described herein for performing a top k computation; or it may be dedicated to performing a top k computation, e.g., an ASIC or programmed FPGA.

Each of the tiles 132-148 is a computing unit, e.g., a hardware accelerator, that includes dedicated memory and distance calculation hardware 152-168. The distance calculation hardware 152-168 for any given tile is hardware that allows the given tile to efficiently compute respective distances between a query vector and a set of candidate vectors. For example, the distance calculation hardware can include a set of multiply accumulate units (MACs) that allow distances according to distance measures like squared $l2$ distances and cosine similarity to be computed through multiplication and accumulation operations performed in hardware.

As a particular example, the integrated circuit 101 can be a neural network accelerator and each of the tiles 132-148 can be configured to perform neural network computations, e.g., matrix multiplications, convolutions, and so on, in hardware. The same hardware, e.g., MACs and the registers that are used to feed inputs into the MACs, that is used to perform the neural network computations can also be used to efficiently compute distances in hardware. For example, a squared $l2$ distance between a candidate vector and a query vector can be computed using a MAC by computing, for each element of the query vector, a difference between the element and the corresponding element of the candidate vector using the accumulate functionality of the MAC and then using the multiply-accumulate functionality of the MAC to, for each element, square the difference for the elements and accumulate the squared difference into a running total of squared differences.

The processing core 102 can be any appropriate hardware that includes a processing element that can, e.g., perform the initializing and iterative updating of the cut-off value that is described below. For example, the processing core 102 can be hardware that includes a processor, e.g., a scalar processor or a central processing unit (CPU) and memory, and that can execute instructions in order to perform the operations described below. More generally, the integrated circuit 101 can perform the initializing and iterative updating of the cut-off value at any component of the circuit 101 that is capable of performing this updating without sending data off-chip.

While the integrated circuit 101 is shown in FIG. 1 as including a single core and a set of tiles, more generally the integrated circuit 101 can include other components in addition to the core and the tiles, e.g., other processing cores, on-chip memory, and so on. Additionally, in some cases, the circuit 101 is a multi-chip package and the core and the tiles are located on one of the multiple chips of the package.

To perform a top k computation, the integrated circuit 101 obtains a query vector and a set of candidate vectors. For example, the integrated circuit 101 can receive both the query vector and the set of candidate vectors from the host 108. As another example, the integrated circuit 101 can receive the query vector from the host 108 and the set of candidate vectors can be the outputs of another operation performed by the integrated circuit 101, e.g., if the integrated circuit 101 implements an embedding machine learning model and the candidate vectors are embeddings of data items that have been provided to the integrated circuit 101.

The integrated circuit 101 then performs the top k computation. In particular, during the top k computation, the integrated circuit 101 uses the distance calculation hardware 152-168 on the tiles 132-148 to compute distances while using the processing core 102 to iteratively update a cut-off distance value until a final cut-off distance value has been determined.

Once the final cut-off distance value has been determined, the integrated circuit 101 provides, e.g., to the host 108, data identifying the candidate vectors that are closer than the final cut-off distance value to the query vector as the output of the top k computation.

Figure 2:
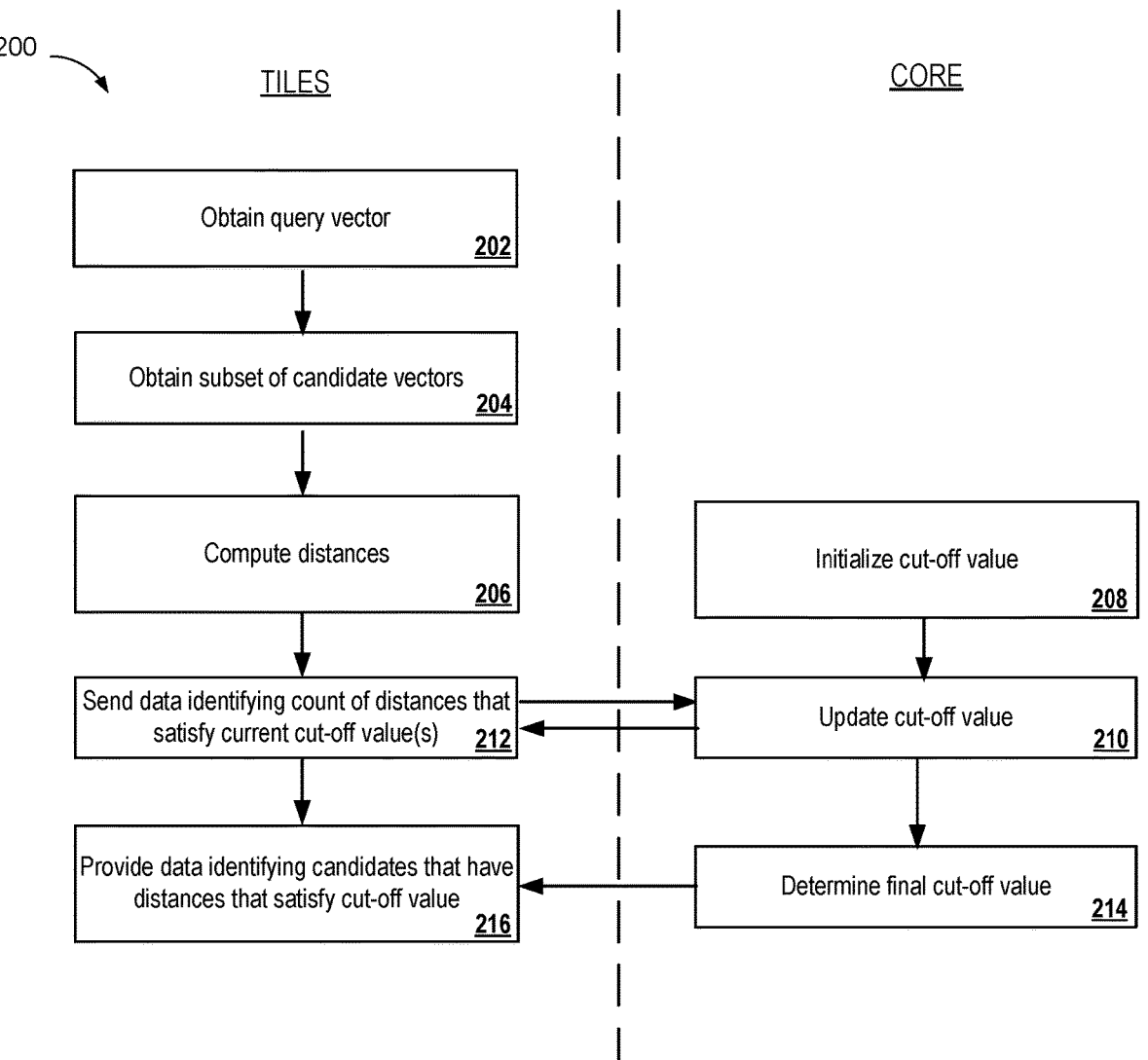
FIG. 2 illustrates an example process for performing a top k computation.

FIG. 2 illustrates an example process 200 for performing a top k computation. For convenience, the process 200 will be described as being performed by an integrated circuit that includes a processing core and a plurality of compute tiles. For example, an integrated circuit in a hardware computation system, e.g., the integrated circuit 101 of the system 100 of FIG. 1, appropriately programmed, can perform the process 200.

In particular, the process 200 includes steps that are performed by the processing core and steps that are performed by each of the compute tiles. More generally, the steps that are described as being performed by the processing core can be performed by any processing component of the integrated circuit that has hardware that is capable of performing operations to maintain an update a cut-off value.

In some cases, for each top k computation performed by the integrated circuit, the value of k is the same. In these cases, the value of k can be stored in the memory of the processing core prior to performing the process 200. In some other cases, different top k computations can have different values of k. In these cases, the processing core can obtain the value of k for the current top k computation from the host prior to performing the process 200 and store the value of k in the memory of the processing core.

Each of the compute tiles obtains the same query vector (step 202). For example, the integrated circuit can receive the query vector from the host and provide the query vector to each compute tile for storage in the dedicated memory of the compute tile.

Each of the compute tiles obtains a respective different subset of a set of candidate vectors (step 204). For example, for each compute tile, the subset of candidate vectors obtained by the tile can be the outputs of a different computation performed by the compute tile. As another example, the host can provide the set of candidate vectors to the integrated circuit and the integrated circuit can partition the set of candidate vectors and provide each of the partitions to a different compute tile. As a particular example, the integrated circuit can store the set of candidate vectors in on-chip memory, e.g., SRAM (static RAM), and then transfer each partition from the on-chip memory to the dedicated memory of the corresponding compute tile.

Each of the compute tiles computes, for each candidate vector in the respective subset of candidate vectors obtained by the compute tile, a respective distance between the candidate vector and the query vector according to a distance measure (step 206). As described above, each compute tile includes hardware, e.g., a set of MACs, that allows the compute tile to efficiently compute the distances in hardware. Each compute tile then stores the respective distances computed by the tile in the dedicated memory of the tile in association with the corresponding candidate vector, e.g., in a memory location of the dedicated memory that is mapped associated with the index of the corresponding candidate vector.

As will be evident from the description below, each tile can perform these distance computations in parallel and only needs to perform the distance computations once at the outset of the top k computation. That is, once the tiles have performed the distance computations, each tile can use the already-computed distances to perform the remainder of the top k computation.

The processing core initializes a cut-off distance value (step 208). In particular, the absolute value of the cut-off distance value is represented as an n-bit value and the processing core initializes the cut-off distance value by assigning a predetermined value to each of the n bits. For example, the processing core can initialize the cut-off distance value to zero by setting each of the bits of the value equal to zero.

The processing core then iteratively updates the cut-off distance value (step 210) until determining a final cut-off distance value (step 214).

In particular, at each iteration, the processing core uses the current cut-off distance value as of the iteration to generate one or more test cut-off distance values.

The processing core provides the test cut-off distance value(s) to each of the compute tiles and each compute tile determines, for each test cut-off distance value, a count of how many of the distances that are maintained by the compute tile satisfy the test cut-off distance value, i.e., are closer than the test cut-off distance value. The compute tiles can perform this determination in parallel and using the distance computation hardware of the tiles, e.g., using the MACs of the tiles. For example, a tile can determine whether a given distance is less than the cut-off value by computing a difference between the cut-off value and the distance using the accumulate functionality of a MAC and then accumulating the count of how many distances are closer using, e.g., the accumulate functionality of another one of the MACs.

That is, each compute tile determines how many of the distances that are stored in the designated memory of the compute tile are closer than the test cut-off distance value. Because each compute tile operates only on distances that the tile has already computed and stored in parallel, the compute tiles can perform this determination in parallel and with extremely low latency.

Each compute tile provides, for each test cut-off distance value, the count of how many of the distances that are maintained by the compute tile satisfy the test cut-off distance value (step 212).

Thus, at each iteration, the processing core receives, from each compute tile, a respective count for each test cut-off distance value for the iteration.

The processing core then uses the respective counts to determine whether any of the current test cut-off distance values should be the final cut-off distance value (and whether the current iteration should be the last iteration) and, if not, to update the cut-off distance value.

Generally, for each of the one or more test cut-off distance values, the processing core computes a respective sum of the respective counts that were received from the compute tiles for the test cut-off distance value. The processing core then determines whether any of the current test cut-off distance values should be the final cut-off distance value (and whether the current iteration should be the last iteration) and, if not, how to update the cut-off distance value based on the respective sums for the test cut-off distance values.

Performing an iteration of updating the cut-off distance value when only a single test cut-off distance value is generated at each iteration is described below with reference to FIG. 3.

Performing an iteration of updating the cut-off distance value when multiple test cut-off distance value is generated at each iteration is described below with reference to FIG. 4.

After the processing core determines the final cut-off distance value, the processing core provides data specifying the final cut-off distance value to each of the compute tiles and each compute tile identifies those candidate vectors in the respective subset for the tile that have distances that satisfy the final cut-off distance value.

Each compute tile then provides data identifying the candidate vectors in the respective subset for the tile that have distances that satisfy the final cut-off distance value (step 216).

For example, each compute tile can use a direct memory access (DMA) engine to transfer only the candidate vectors in the respective subset for the tile that have distances that satisfy the final cut-off distance value from the dedicate memory for the tile to on-chip memory. That is, the compute tile can perform a DMA operation that transfers only the candidate vectors that have distances for which the result of a compare operation is "true" to the on-chip memory, where the result of the compare operation is "true" only if the distance for the candidate vector is less than the final cut-off value.

The integrated circuit can then provide the candidate vectors from the on-chip memory to the host as the output of the top k computation.

In some cases, as will be described below, for some iterations of the process 200 there may be a distance "tie," such that less than k distances are closer than the final cut-off distance value but more than k more distances are closer than the next highest possible cut-off distance value, i.e., because some number of candidates have a distance that is equal to the final cut-off distance value.

In some of these cases, the integrated circuit returns only the candidates that have distances that are closer than the final cut-off distance value.

In others of these cases, e.g., if the output of the top k computation must return exactly k candidate vectors, the integrated circuit can arbitrarily select a subset of the candidates that have a distance that is equal to the final cut-off distance value, i.e., so that the total number of arbitrarily selected candidates plus the candidates with distances closer than k is equal to k, and provide the arbitrarily selected candidates along with the candidates with distances closer than k as the output of the top k computation.

As described above, in some cases the integrated circuit can include a multi-chip package, with the operations of the process 200 being performed by one of the chips in the package. In some of these cases, the operations of the process 200 are part of a larger top k computation and multiple chips within the multi-chip package perform the process 200 with the same query vector but on a different set of candidate vectors. In these cases, the host or one of the processing cores on one of the chips can determine the output of the larger top k computation from the outputs generated by the individual chips in the package.

Moreover, in some cases, the integrated circuit can perform the process 200 in parallel for a batch of multiple query vectors.

Figure 3:
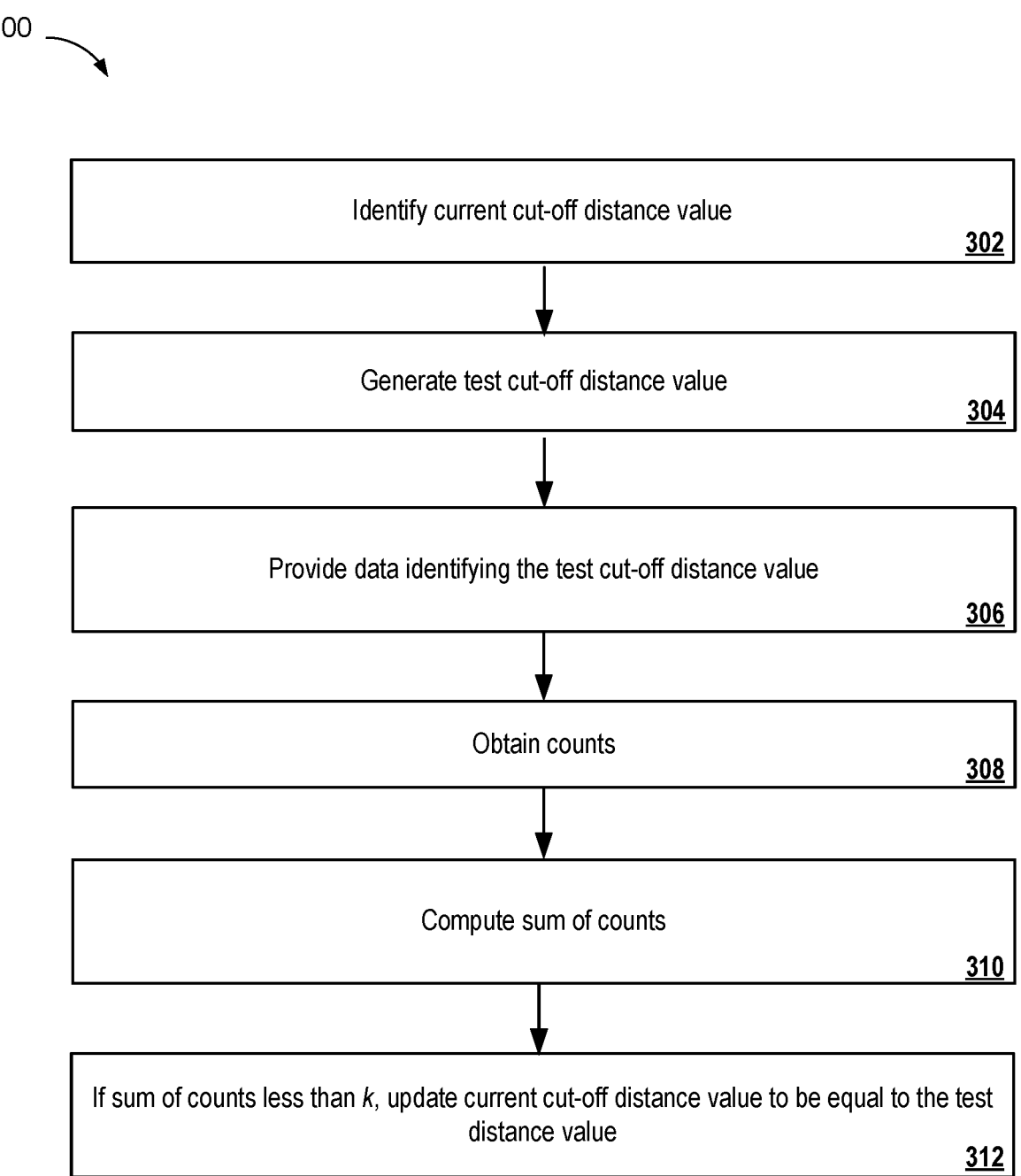
FIG. 3 illustrates an example process for performing an iteration of updating the cut-off distance value.

FIG. 3 illustrates an example process 300 for performing an iteration of updating the cut-off distance value. For convenience, the process 300 will be described as being performed by a processing core of an integrated circuit that includes the processing core and a plurality of compute tiles. For example, a processing core of an integrated circuit in a hardware computation system, e.g., the processing core 102 of the integrated circuit 101 of the system 100 of FIG. 1, appropriately programmed, can perform the process 300.

In the process 300, the processing core generates a single test cut-off value at each iteration. In particular, each iteration corresponds to a different one of the n bits that represent the value of the cut-off value. The first iteration corresponds to the least significant bit and the processing core continues performing iterations of the process 300 until reaching the most significant bit or until other termination criteria are satisfied, as described below.

The processing core identifies the current cut-off distance value as of the iteration (step 302). For the first iteration, the current cut-off distance value is the value to which the cut-off distance value was initialized. For each iteration after the first iteration, the current cut-off distance value is the updated cut-off distance value from the preceding iteration.

The processing core generates a test cut-off value for the iteration that includes (i) a value of 1 for the bit corresponding to the iteration and (ii) the same values as the current cut-off distance value as of the iteration for the bits corresponding to any earlier iterations (step 304). That is, for iteration k, the test cut-off value includes the same values as the current cut-off value for bits 1 through k−1, where bit 1 is the least significant bit, and a value of one for bit k.

The processing core provides data identifying the test cut-off value to the compute tiles (step 306). For example, the processing core can provide the value of only the newly assigned bit or can provide values of all of the bits that have already been assigned.

The processing core obtains, from each of the compute tiles, a respective count for the test cut-off value (step 308). That is, each compute tile computes, for the test cut-off value, a respective count as described above.

The processing core computes a sum of the respective counts (step 310) and determines whether the sum is smaller than k (step 312), i.e., whether fewer than k total candidate vectors are closer to the query vector than the test cut-off value.

If the sum is smaller than k, the processing core sets the current cut-off distance value equal to the test cut-off distance value (step 314) and proceeds to the next iteration of the process 300.

If the sum is equal to k, the processing core sets the test cut-off distance value equal to the final cut-off distance value and does not perform any more iterations of the process 300.

If the sum is greater than k, the processing core determines that there is a distance "tie," because less than k distances are closer than the current cut-off distance value but more than k distances are closer than the next highest possible cut-off distance value, i.e., the test cut-off value— this indicates that some number of candidates have a distance that is equal to the current cut-off distance value.

In some of these cases, the integrated circuit returns only the candidates that have distances that are closer than the current cut-off distance value.

In others of these cases, e.g., if the output of the top k computation must return exactly k candidate vectors, the integrated circuit can arbitrarily select a subset of the candidates that have a distance that is equal to the current cut-off distance value and provide the arbitrarily selected candidates along with the candidates with distances closer than the current cut-off value as the output of the top k computation. For example, the integrated circuit can cause one or more of the tiles that returned larger counts for the test cut-off distance value than for the current cut-off distance value (in the previous iteration of the process 300) to return specified numbers of candidate vectors that have distances equal to the current cut-off distance value in addition to returning all of the candidate vectors that have distances closer than the current cut-off distance value.

FIG. 4 illustrates another example process 400 for performing an iteration of updating the cut-off distance value. For convenience, the process 400 will be described as being performed by a processing core of an integrated circuit that includes the processing core and a plurality of compute tiles. For example, a processing core of an integrated circuit in a hardware computation system, e.g., the processing core 102 of the integrated circuit 101 of the system 100 of FIG. 1, appropriately programmed, can perform the process 400.

In the process 400, the processing core generates multiple test cut-off value at each iteration. In particular, each iteration corresponds to a different plurality of the n bits that represent the value of the cut-off value. The first iteration corresponds to a plurality of least significant bits and the processing core continues performing iterations of the process 400 until reaching the most significant bit or until other termination criteria are satisfied, as described below.

The processing core identifies the current cut-off distance value as of the iteration (step 402).

The processing core generates a plurality of test cut-off values for the iteration (step 404). Each of the plurality of test cut-off values includes (i) a different combination of values for the bits corresponding to the iteration from each other test cut-off value and (ii) the same values as the current cut-off distance value as of the iteration for the bits corresponding to any earlier iterations. As a particular example, the processing core can generate respective test cut-off value for each possible different combination of values for the bits corresponding to the iteration. Thus, in this example, when there are 4 bits per iteration, the processing core generates 16 test cut-off values per iteration, each with a different combination of values for the 4 bits corresponding to the iteration and the same values for the bits corresponding to earlier iterations.

The processing core provides data identifying the test cut-off values to the compute tiles (step 406). For example, for a given test cut-off value, the processing core can provide the values of only the newly assigned bits or can provide values of all of the bits that have already been assigned.

The processing core obtains, from each of the compute tiles and for each of the test cut-off values, a respective count for the test cut-off value (step 408).

The processing core computes, for each of the test cut-off values, a respective sum of the respective counts for the test cut-off value (step 410).

The processing core determines whether any of the sums are equal to k (step 412).

If all of the sums are less than k, the processing core sets the current cut-off distance value equal to the highest test cut-off distance value (step 414) and proceeds to the next iteration of the process 400.

If one or more of the sums are equal to k, the processing core sets the final cut-off distance value equal to the smallest test cut-off distance value having the sum that is equal to k and does not perform any more iteration of the process 400.

If one or more of the sums are greater than k but none are equal to k, the processing core determines that there is a distance "tie," i.e., determines that this indicates that some number of candidates have a distance that is equal to the largest test cut-off distance value that has a sum that is less than k (referred to as the "particular test cut-off distance value" below) or, if the smallest test cut-off distance value has a sum that is greater than k, the current cut-off distance value.

In some of these cases, the integrated circuit returns only the candidates that have distances that are closer than the particular test cut-off distance value or, if the smallest test cut-off distance value has a sum that is greater than k, the current cut-off distance value.

In others of these cases, e.g., if the output of the top k computation must return exactly k candidate vectors, the integrated circuit can arbitrarily select a subset of the candidates that have a distance that is equal to than the particular test cut-off distance value or, if the smallest test cut-off distance value has a sum that is greater than k, the current cut-off distance value and provide the arbitrarily selected candidates along with the candidates with distances closer than the particular test cut-off distance value or, if the smallest test cut-off distance value has a sum that is greater than k, the current cut-off distance value as the output of the top k computation. For example, the integrated circuit can cause one or more of the tiles that returned larger counts for the smallest test cut-off distance value that has a sum greater than k than for the particular test cut-off distance value to return specified numbers of candidate vectors that have distances equal to the particular test cut-off distance value in addition to returning all of the candidate vectors that have distances closer than the particular test cut-off distance value.

Where, as described above, the integrated circuit 101 is appropriately programmed to perform a process, this can involve one or more computer-readable storage media storing instructions that, when executed by the integrated circuit cause the integrated circuit, to perform the process, e.g., to perform a top k computation by distributing the computation across the plurality of computing units (hardware compute tiles). Such instructions can be stored on any suitable media including, but not limited to, any sort of memory.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by an integrated circuit comprising a plurality of computing units that each includes a dedicated memory and a set of multiply accumulate units that allow distances according to distance measures to be computed through multiplication and accumulation operations performed in hardware, the method comprising:

receiving, by the integrated circuit, a query vector;

receiving, by the integrated circuit, a set of candidate vectors;

storing in the dedicated memory, for each of the plurality of computing units and for each candidate vector in a respective subset of the candidate vectors assigned to the computing unit, a respective distance between the query vector and the candidate vector from the respective set of multiply accumulate units;

setting, by the integrated circuit, a cut-off distance value to a predetermined value;

performing, by the integrated circuit, a plurality of iterations comprising, at each of the plurality of iterations:

generating one or more test cut-off distance values for the iteration from the cut-off distance value as of the iteration;

receiving, by each of the plurality of computing units and for each of the test cut-off distance values, a respective count of a number of the respective distances from the computing unit and stored in the designated memory of the computing unit that satisfy the test cut-off distance value, wherein the respective counts are stored in parallel across the plurality of computing units; and updating, by the integrated circuit, the cut-off distance value using the respective counts from each of the plurality of computing units and for each of the test cut-off distance values; and after performing the plurality of iterations, providing, by the integrated circuit and as an output of a top k computation for the query vector and the set of candidate vectors, the candidate vectors that have respective distances that satisfy the cut-off distance value.

2. The method of claim 1, wherein the setting the cut-off distance value, the generating the one or more test cut-off distance values, and the updating the cut-off distance value are performed by a processing core of the integrated circuit that is separate from the computing units.

3. The method of claim 2, wherein performing the plurality of iterations further comprises, at each iteration:

providing, from the processing core and to each of the computing units, data identifying the one or more test cut-off distance values for the iteration; and providing, from each computing unit and to the processing core, the respective counts for each of the test cut-off distance values.

4. The method of claim 1, wherein providing, by the integrated circuit and as an output of a top k computation for the query vector and the set of candidate vectors, the candidate vectors that have respective distances that satisfy the cut-off distance value comprises:

providing, by each of the computing units, the candidate vectors from the respective subset assigned to the computing unit that have respective distances that satisfy the cut-off distance value.

5. The method of claim 1, wherein a respective sum of the respective counts from each of the plurality of computing units is associated with each test cut-off distance value.

6. The method of claim 5, wherein there is a single test cut-off distance value and wherein the updating further comprises:

in response to the respective sum being less than k, updating the cut-off distance value to be equal to the test cut-off distance value.

7. The method of claim 5, wherein there are a plurality of test cut-off distance values and wherein the updating further comprises:

updating the cut-off distance value to be equal to the test cut-off distance value that has a largest respective sum from among the plurality of test cut-off distance values that have respective sums that are less than k.

8. The method of claim 1, wherein the cut-off distance value is represented by a sequence of bits, wherein each of the plurality of iterations corresponds to a different bit in the sequence, and wherein generating one or more test cut-off distance values for the iteration from the cut-off distance value as of the iteration comprises generating a test cut-off distance value that has (i) a value of one for the bit corresponding to the iteration and (ii) the same values for the bits corresponding to any preceding iterations as the cut-off distance value as of the iteration.

9. The method of claim 1, wherein the cut-off distance value is represented by a sequence of bits, wherein each of the plurality of iterations corresponds to a different plurality of bits in the sequence, and wherein generating one or more test cut-off distance values for the iteration from the cut-off distance value as of the iteration comprises generating a plurality of test cut-off distance values, wherein each of the plurality of test cut-off distance values has (i) a different combination of values from the plurality of bits corresponding to the iteration and (ii) the same values for the bits corresponding to any preceding iterations as the cut-off distance value as of the iteration.

10. The method of claim 1, wherein performing, by the integrated circuit, the plurality of iterations, comprises, at a last iteration of the plurality of iterations: setting the cut-off distance value equal to the updated cut-off distance value after the iteration when for the updated cut-off distance value after the iteration, a sum of the respective counts from the plurality of computing units for the updated cut-off distance value after the iteration is equal to k.

11. One or more non-transitory computer-readable storage media storing instructions that, when executed by an integrated circuit that comprises a plurality of computing units that each includes a dedicated memory and a set of multiply accumulate units that allow distances according to distance measures to be computed through multiplication and accumulation operations performed in hardware, cause the integrated circuit to perform operations comprising:

receiving, by the integrated circuit, a query vector;

receiving, by the integrated circuit, a set of candidate vectors;

storing in the dedicated memory, for each of the plurality of computing units and for each candidate vector in a respective subset of the candidate vectors assigned to the computing unit, a respective distance between the query vector and the candidate vector from the respective set of multiply accumulate units;

setting, by the integrated circuit, a cut-off distance value to a predetermined value;

performing, by the integrated circuit, a plurality of iterations comprising, at each of the plurality of iterations:

generating one or more test cut-off distance values for the iteration from the cut-off distance value as of the iteration;

receiving, by each of the plurality of computing units and for each of the test cut-off distance values, a respective count of a number of the respective distances from the computing unit and stored in the designated memory of the computing unit that satisfy the test cut-off distance value, wherein the respective counts are stored in parallel across the plurality of computing units; and updating, by the integrated circuit, the cut-off distance value using the respective counts from each of the plurality of computing units and for each of the test cut-off distance values; and after performing the plurality of iterations, providing, by the integrated circuit and as an output of a top k computation for the query vector and the set of candidate vectors, the candidate vectors that have respective distances that satisfy the cut-off distance value.

12. An integrated circuit comprising a plurality of computing units that each includes a dedicated memory and a set of multiply accumulate units that allow distances according to distance measures to be computed through multiplication and accumulation operations performed in hardware, wherein the integrated circuit is configured to perform operations comprising:

receiving, by the integrated circuit, a query vector;

receiving, by the integrated circuit, a set of candidate vectors;

storing in the dedicated memory, for each of the plurality of computing units and for each candidate vector in a respective subset of the candidate vectors assigned to the computing unit, a respective distance between the query vector and the candidate vector from the respective set of multiply accumulate units;

setting, by the integrated circuit, a cut-off distance value to a predetermined value;

performing, by the integrated circuit, a plurality of iterations comprising, at each of the plurality of iterations:

generating one or more test cut-off distance values for the iteration from the cut-off distance value as of the iteration;

receiving, by each of the plurality of computing units and for each of the test cut-off distance values, a respective count of a number of the respective distances from the computing unit and stored in the designated memory of the computing unit that satisfy the test cut-off distance value, wherein the respective counts are stored in parallel across the plurality of computing units; and updating, by the integrated circuit, the cut-off distance value using the respective counts from each of the plurality of computing units and for each of the test cut-off distance values; and after performing the plurality of iterations, providing, by the integrated circuit and as an output of a top k computation for the query vector and the set of candidate vectors, the candidate vectors that have respective distances that satisfy the cut-off distance value.

13. The integrated circuit of claim 12, wherein the setting the cut-off distance value, the generating the one or more test cut-off distance values, and the updating the cut-off distance value are performed by a processing core of the integrated circuit that is separate from the computing units.

14. The integrated circuit of claim 13, wherein performing the plurality of iterations further comprises, at each iteration:

providing, from the processing core and to each of the computing units, data identifying the one or more test cut-off distance values for the iteration; and providing, from each computing unit and to the processing core, the respective counts for each of the test cut-off distance values.

15. The integrated circuit of claim 12, wherein providing, by the integrated circuit and as an output of a top k computation for the query vector and the set of candidate vectors, the candidate vectors that have respective distances that satisfy the cut-off distance value comprises:

providing, by each of the computing units, the candidate vectors from the respective subset assigned to the computing unit that have respective distances that satisfy the cut-off distance value.

16. The integrated circuit of claim 12, wherein a respective sum of the respective counts from each of the plurality of computing units is associated with each test cut-off distance value.

17. The integrated circuit of claim 16, wherein there is a single test cut-off distance value and wherein the updating further comprises:

in response to the respective sum being less than k, updating the cut-off distance value to be equal to the test cut-off distance value.

18. The integrated circuit of claim 16, wherein there are a plurality of test cut-off distance values and wherein the updating further comprises:

updating the cut-off distance value to be equal to the test cut-off distance value that has a largest respective sum from among the plurality of test cut-off distance values that have respective sums that are less than k.

19. The integrated circuit of claim 12, wherein the cut-off distance value is represented by a sequence of bits, wherein each of the plurality of iterations corresponds to a different bit in the sequence, and wherein generating one or more test cut-off distance values for the iteration from the cut-off distance value as of the iteration comprises generating a test cut-off distance value that has (i) a value of one for the bit corresponding to the iteration and (ii) the same values for the bits corresponding to any preceding iterations as the cut-off distance value as of the iteration.

20. The integrated circuit of claim 12, wherein the cut-off distance value is represented by a sequence of bits, wherein each of the plurality of iterations corresponds to a different plurality of bits in the sequence, and wherein generating one or more test cut-off distance values for the iteration from the cut-off distance value as of the iteration comprises generating a plurality of test cut-off distance values, wherein each of the plurality of test cut-off distance values has (i) a different combination of values from the plurality of bits corresponding to the iteration and (ii) the same values for the bits corresponding to any preceding iterations as the cut-off distance value as of the iteration.

* * * * *